(12) United States Patent
Freeman et al.

(10) Patent No.: US 7,854,684 B1
(45) Date of Patent: Dec. 21, 2010

(54) WEARABLE DEVICE

(75) Inventors: Gary A. Freeman, Newton, MA (US);
David H. Freeman, Tampa, FL (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 2275 days.

(21) Appl. No.: 09/689,305

(22) Filed: Oct. 12, 2000

Related U.S. Application Data

(60) Division of application No. 09/360,435, filed on Jul. 26, 1999, now abandoned, which is a continuation-in-part of application No. 09/103,481, filed on Jun. 24, 1998, now Pat. No. 5,931,764.

(51) Int. Cl.
*A63B 71/00* (2006.01)

(52) U.S. Cl. .................... 482/4; 482/1; 442/236

(58) Field of Classification Search ............... 482/1–9, 482/900–902; 362/103–108; 345/1.1, 1.3; 442/181, 236
See application file for complete search history.

(56) References Cited

U.S. PATENT DOCUMENTS

| | | | |
|---|---|---|---|
| 4,120,053 A | 10/1978 | Nemirofsky | |
| 4,380,699 A | 4/1983 | Monnier et al. | |
| 4,704,003 A | 11/1987 | Komaki et al. | |
| 4,746,787 A | 5/1988 | Suto et al. | |
| 4,774,434 A * | 9/1988 | Bennion | 313/500 |
| D305,023 S | 12/1989 | Suto | |
| 4,954,985 A | 9/1990 | Yamazaki et al. | |
| 5,055,968 A | 10/1991 | Nishi et al. | |
| 5,081,852 A | 1/1992 | Cox | |
| 5,142,510 A | 8/1992 | Rodda | |
| 5,305,181 A | 4/1994 | Schultz | |
| 5,315,377 A | 5/1994 | Isono et al. | |
| 5,359,183 A | 10/1994 | Skodlar | |
| 5,375,044 A * | 12/1994 | Guritz | 362/104 |
| 5,514,861 A | 5/1996 | Swartz | |
| 5,516,603 A | 5/1996 | Holcombe | |
| 5,517,011 A | 5/1996 | Vandenengel | |
| 5,572,401 A | 11/1996 | Carroll | |
| 5,593,765 A * | 1/1997 | Sharpe et al. | 442/236 |
| 5,594,493 A | 1/1997 | Nemirofsky | |
| 5,625,477 A | 4/1997 | Wu et al. | |
| 5,636,044 A | 6/1997 | Yuan et al. | |
| 5,638,194 A | 6/1997 | Yamada et al. | |
| 5,657,201 A | 8/1997 | Kockis | |

(Continued)

FOREIGN PATENT DOCUMENTS

JP 60-204056 10/1985

(Continued)

OTHER PUBLICATIONS

Doane et al., Reflective Cholesteric Liquid-Crystal Displays, *Information Display* (Dec. 1996).

(Continued)

*Primary Examiner*—Glenn Richman
(74) *Attorney, Agent, or Firm*—Innovation Counsel LLP

(57) ABSTRACT

An article of clothing constructed from one or more materials includes a flexible display element attached to the one or more materials of the article of clothing and circuitry for controlling the flexible display element.

5 Claims, 13 Drawing Sheets

U.S. PATENT DOCUMENTS

| | | | |
|---|---|---|---|
| 5,682,294 A | 10/1997 | Horejs, Jr. et al. | |
| 5,693,956 A | 12/1997 | Shi et al. | |
| 5,703,755 A | 12/1997 | Flesher et al. | |
| 5,719,744 A | 2/1998 | Jenkins et al. | |
| 5,734,154 A | 3/1998 | Jachimowicz et al. | |
| 5,755,554 A * | 5/1998 | Ryall | 415/199.4 |
| 5,777,903 A | 7/1998 | Piosenka et al. | |
| 5,798,907 A | 8/1998 | Janik | |
| 5,841,738 A | 11/1998 | Kamei et al. | |
| 5,906,004 A * | 5/1999 | Lebby et al. | 2/1 |
| 6,013,346 A * | 1/2000 | Lewis et al. | 428/78 |
| 6,036,093 A | 3/2000 | Schultz | |
| 6,096,666 A * | 8/2000 | Jachimowicz et al. | 442/188 |
| 6,118,426 A | 9/2000 | Albert et al. | |
| 6,120,588 A | 9/2000 | Jacobson | |
| 6,124,851 A | 9/2000 | Jacobson | |
| 6,125,286 A | 9/2000 | Jahagirdar et al. | |
| 6,252,564 B1 * | 6/2001 | Albert et al. | 345/1.3 |

FOREIGN PATENT DOCUMENTS

| | | |
|---|---|---|
| JP | 61-013614 U | 1/1986 |
| JP | 02-210487 | 8/1990 |
| JP | 04-040807 U | 4/1992 |
| JP | 05-122733 | 5/1993 |
| JP | 05-346903 | 12/1993 |
| JP | 07-120770 | 5/1995 |
| JP | 10-010999 | 1/1998 |

OTHER PUBLICATIONS

Merkert, The Scoop on Chips, *Moneycard Collector* (Jan. 27, 1998).

Yaniv, Reflective Cholesteric Displays, *Information Display* (Oct. 1995).

Yuan, Bistable Reflective Cholesteric Displays (article—no publication name).

Polymer-dispersed LCDs, printed from Internet on Sep. 17, 1997 http://stefan.www.media.mit.edu/people/stefan/liquid-crystals/node9.html.

Ferroelectric LCDs, printed from Internet on Sep. 14, 1997, Published: Jun. 1992, HTML: 30/08/95, file:///C/My Documents/Gary/smart card/ferro 1.htm.

A Contactless Multiservice System—Technology transfer, Innovation Industries/Roland Moreno Technology, product new release, Paris, France, 3 pages, 1997.

Flat Panels' Flexible Future, The Clock, Dec. 1999.

Dimitrakopoulos et al., Low-Voltage Organic Transistors on Plastic Comprising High-Dielectric Constant Gate Insulators, Science 283:822-824 (1999).

* cited by examiner

WEARABLE DEVICE

REFERENCE TO RELATED APPLICATIONS

This application is a divisional of U.S. application Ser. No. 09/360,435, filed Jul. 26, 1999 now abandoned, which is a continuation-in-part of allowed U.S. application Ser. No. 09/103,481, filed on Jun. 24, 1998 now U.S. Pat. No. 5,931,764, which is incorporated by reference herein.

BACKGROUND OF THE INVENTION

Recently, watches and other wearable devices have begun to offer functions beyond simple display of the time. For example, some watches have incorporated keyboards and offer the ability to store and retrieve information such as addresses and phone numbers. These devices, however, remain housed in rigid and sometimes bulky housings. For an active user, such as a jogger, even the relatively minor bulk of a conventional wristwatch can be an annoyance.

SUMMARY OF THE INVENTION

In general, in one aspect, the invention features an article of clothing constructed from one or more materials that includes a flexible display element attached to the one or more materials of the article of clothing and control circuitry connected to the flexible display element.

Embodiments may include one or more of the following features. The flexible display element may be permanently attached to the one or more materials. The flexible display element may be sewn to the one or more materials. The flexible display element may be adhesively attached to the one or more materials. The article of clothing may be a shoe, a hat, pants, a belt, or a wireless communication element.

In general, in another aspect, a wearable article of clothing includes a flexible strap configured and sized to secure onto a wearer. The flexible strap includes a holographic layer substantially covering the strap's visible exterior.

Embodiments may include one or more of the following features. The holographic layer may be a holographic image of leather and metal. The article may include a display element connected to the strap and circuitry connected to the display element for controlling the display presented by the display element. The display element may include a flexible display element.

In general, in one aspect, a wearable device includes a display element, display control circuitry connected to the display element, and a flexible body for supporting the display element. The body is configured and sized to secure onto a wearer and includes one or more components for maintaining a configuration imparted by a wearer.

Embodiments may include one or more of the following features. The component(s) may be a wire. The component(s) may be a series of rigid components connected via a cup-and-ball arrangement. The display may be a flexible display. The device may include a wireless communication element, and at least one input control. The device may be a personal digital assistant and/or a video game system.

In general, in one aspect, the invention features a wearable device that includes a flexible display element, circuitry connected to the flexible display element for executing instructions that control the display presented by the flexible display element, and a flexible body configured and sized to secure the wearable device onto a wearer.

Embodiments may include one or more of the following. The device may additionally include at least one input control. The input control may be a directional input control (e.g., a joystick). The input control may be a microphone. The instructions may include instructions for personal digital assistant software, a timer, an electronic game, a wireless communicator such as a pager or cellular receiver, and/or a remote control.

The device may also include a sensor. In these embodiments the device can include instructions for collecting and storing physiological data of the wearer.

Advantages can include one or more of the following.

Incorporation of the flexible display element and circuitry into articles of clothing provide the wearer with a comfortable, lightweight, portable device for viewing images and/or data.

Including a holographic layer (e.g., the strap) can give the device the appearance of a different material while remaining lightweight and comfortable.

The device can include materials or mechanisms that allow the wearer to remove the device from the wearer's body and place the wearable device on a surface or attach the wearable device to an object for more convenient and ergonomic viewing of the device display.

Use of a wireless joystick in conjunction with the wearable device provides a wearer with an easy mechanism for providing directional control to programs executing on the wearable device.

Other features and advantages of the invention will be apparent from the following detailed description, and from the claims.

DESCRIPTION OF THE PREFERRED EMBODIMENTS

Figure 1:
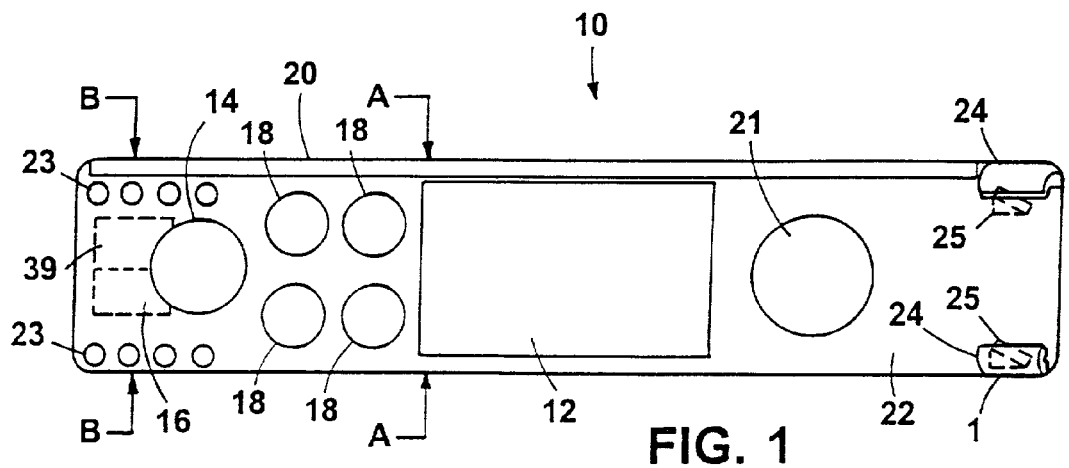
FIG. 1 is a diagram of a wearable device with a flexible display element.

Referring to FIG. 1, a wearable device 10 includes a flexible display element 12 and a strap 22 that forms the body of the device 10. The strap 22 can secure the device 10 around a person's wrist. Differently sized straps 22 can secure the device 10 around other body parts such as an ankle, leg, or finger, or around an inanimate object. The device 10 incorporates lightweight, flexible components that enable the device to conform to a given contour and offer a slim profile. The device 10 may safely undergo flexing of the type and magnitude normally experienced by watches, anklets, etc. during physical activity.

As shown, the strap 22 has an overmolded, flexible polymer (e.g., polyurethane) buckle 24. Strap holes 23 slide into the buckle under buckle 24 rails. A molded ramp 25 provides a latching mechanism that engages the holes. Pulling the strap 22 radially away from the wrist releases the strap 22 from the buckle 24. Alternatively, the strap 22 could use velcro, a peg and hole mechanism, or other fasteners.

The device 10 can present information via the flexible display element 12 and a thin-film flexible piezoelectric speaker 21 that offers multiple-octave sound. U.S. Pat. No. 5,115,472 to Park describes a flexible piezoelectric speaker/microphone made of polymer films, and is incorporated herein. The device 10 can receive information via input keys 18. The piezoelectric speaker/microphone 21 also enables the device 10 to receive sound information. Thus, a user can speak into the device 10, for example, to record speech or use the device as a communication device.

The device 10 can communicate with external devices, such as computers and smart card readers, via a communication element 16. The communication element 16 may be a wireless inductive loop screen-printed within the body of the device 10. The communication element 16 can enable the device 10 to process RF communication such as cellular messaging service communication, GPS (Global Positioning System) signals, and paging signals.

Alternately, the communication element 16 may take the form of shielded electrical contacts. As the device 10 may be narrower than a smart card, a passive mechanical adapter may be needed to connect the device 10 to a smart card reader if the device 10 uses a contact communication element 16.

The device 10 may include a power source 14 such as a flexible thin-film lithium battery, such as Oak Ridge National Laboratories' thin-film battery. The flexible display element 12, however, does not require a power source to produce a static display.

Figure 2A:
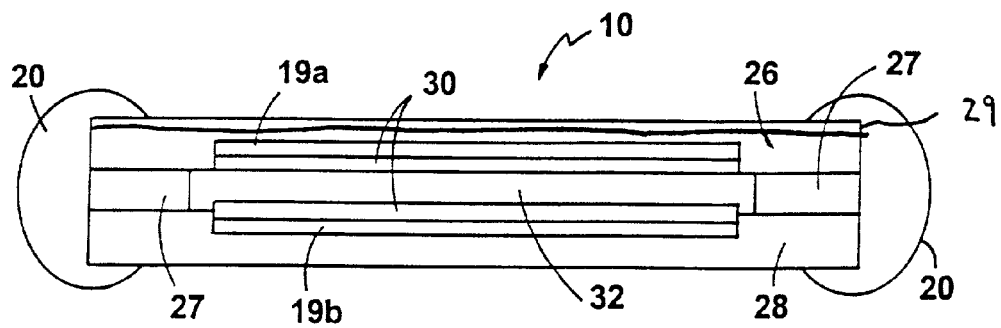
FIG. 2A is a cross-sectional view of the wearable device shown through cross section A-A of FIG. 1.
Figure 2B:
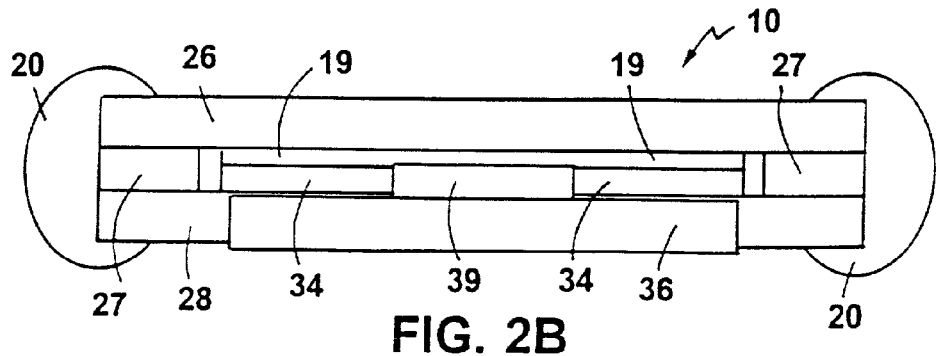
FIG. 2B is a cross-sectional view of the wearable device shown through cross section B-B of FIG. 1.

Referring to FIGS. 2A and 2B, the device 10 includes protective top 26 and bottom 28 layers and inner separator 27. The top layer 26 covers the display element with a transparent material such as PVC or clear plastic. The top 26 and bottom 28 layers may otherwise be constructed from a flexible polymer such as polycarbonate. Other embodiments can use plastic, paper, reinforced paper, cardboard, polyvinyl chloride, polyester, or ABS as layer material. Portions of the top 26 and bottom 28 layers may include printed indicia.

The device 10 can include a flexible holographic layer 29, for example, by using flexible holographic strips produced by Krystal Holographics International Inc. The layer 26 can cover all or any portion of the visible exterior of the strap excluding the flexible display. The holographic image presented by holographic layer 29 can make the strap appear to be made of a material such as leather or metal. This can allow the strap to appear to be a metal band while having the advantage of weight substantially less than a band that is actually made of metal.

In some embodiments, the holographic layer can be easily removed from the wearable device and replaced with a different holographic layer. For example, the holographic layer edges may be forced between edges of the polymer edging 20 for easy removal and insertion of different holographic layers. The soft edging 20 adds comfort to a wearer. Additionally, in some embodiments the edging 20 waterproofs the assembly.

Layers 26 and 28 may be molded or machined into the necessary shape to accommodate internal components. The internal components can include an integrated circuit 39 mounted above a printed circuit board 36. The integrated circuit 39 can offer a variety of functions ranging from providing simple digital clock to processing video graphics information. The integrated circuit 39 may include a microprocessor 40. The size of the integrated circuit 39 and printed circuit board 36 is exaggerated in the cross-sectional view of FIG. 23.

In some embodiments circuitry is provided by an organic semiconducting layer such as the layer described in Low-Voltage Organic Transistors on Plastic Comprising High-Dielectric Constant Gate Insulators, Science Vol. 283, 5 Feb. 1999.

The flexible display element 12 can be made from a variety of materials. In one implementation, transparent electrodes 30 (indium tin oxide or other substantially clear conductive material) are deposited on the interior surfaces of the top 26 and bottom 28 layers. The electrodes may be configured to provide either a dot matrix pattern or a segmented display pattern. Z-axis conductor 34 (known polymeric material with conductivity only in the Z axis) provides conductive paths from the printed circuit board to the electrodes which fork into electrode layers 19a and 19b that appear in the top 26 and bottom 28 layers.

The electrodes work in conjunction with liquid crystal display (LCD) film 32, which is a bi-stable or multi-stable display material that will maintain an image when power has been removed. In this way, it is unnecessary for the device 10 to have its own power source, or be connected to a power source, for the display to function. The preferred LCD material is a ferroelectric LCD. These LCDs are based on smectic liquid crystals typically of the smectic C phase with chiral behavior. When formed in a thin layer the ferroelectric material has a net polarization that is perpendicular to the viewing surface. The electrodes apply a field that rotates polarization between an "on" and an "off" state. Ferroelectric LCDs are typically sensitive to shock or bending, making them unsuitable for use in a display element 12 that can be bent and flexed. To make the ferroelectric LCD less sensitive to bending, the ferroelectric liquid crystal (FLC) is fixed to a side-chain of the polymer used to create the LCD film (e.g., as taught in Japanese Patent Document No. 63-318526) or where the FLC is dispersed in the polymer film (e.g., as taught in U.S. Pat. No. 5,638,194). As a result, the display can display information while in the flexed position (e.g., when strapped around a wearer's wrist).

The display of the wearable device may safely undergo "flexing of the type and magnitude experienced during normal use and handling." For example, when worn around a wrist, finger, or ankle the display may deflect considerably (e.g., 1 or 2 cms).

The display may not function perfectly, or at all, while the display is flexed into a curved shape, but once the display is allowed to assume its original shape it will again function correctly. Contributing to this flexibility are the polymer substrates (top and bottom layers) and the z-axis conductor for making connections between the printed circuit board and the display. The z-axis conductor can withstand the variable compression that flexing produces.

Other implementations can include different display elements such as suspended particle displays or light emitting polymer displays. These display elements, however, require a power source to display images.

Figure 3:
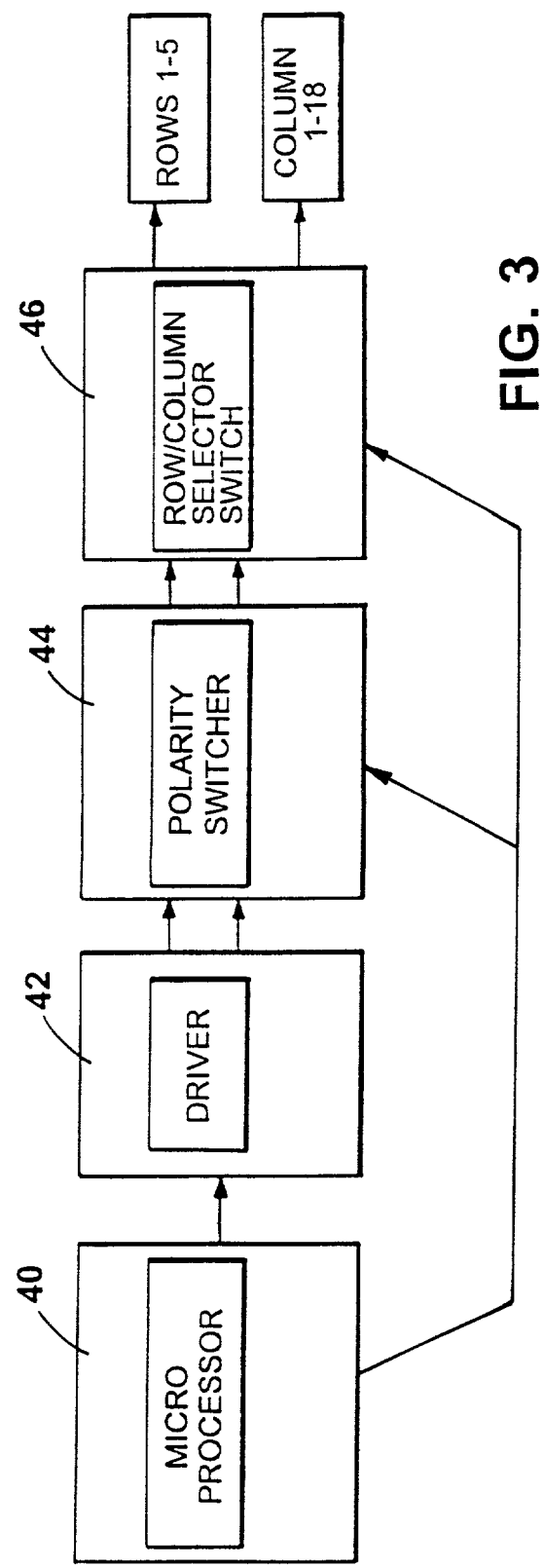
FIG. 3 is a circuit block diagram of display components.

Referring to FIG. 3, the microprocessor 40 of the integrated circuit 39 controls a driver circuit 42, which develops the voltages appropriate to activate and deactivate the display element pixels. The display driving circuitry can use a multiplexed technique used in commercial passive displays to quickly refresh the display. A power source in the device 10 or an external power source (e.g., a smart card reader) can provide the power needed by the microprocessor 40 and other stages. Polarity switcher 44 at the output of the driver circuit selects whether the row or column electrode is to receive the positive polarity. Row/column selector switch determines which specific row/column pair receives the voltages produced by the polarity switch and driver circuit. Microprocessor 40 controls the driver circuit 42, polarity switcher 44, and row/column selector switch 46. Contributing to display flexibility are polymer substrates (top and bottom layers) and the z-axis conductor for making connections between the printed circuit board and the electrodes 19. The z-axis conductor can withstand the variable compression that flexing produces.

The microprocessor 40 can also display a graphic image or a series of graphic images to produce animation sequences on the display element 12 by retrieving and displaying different stored image information. The images may form a video or slide-show.

Figure 4:
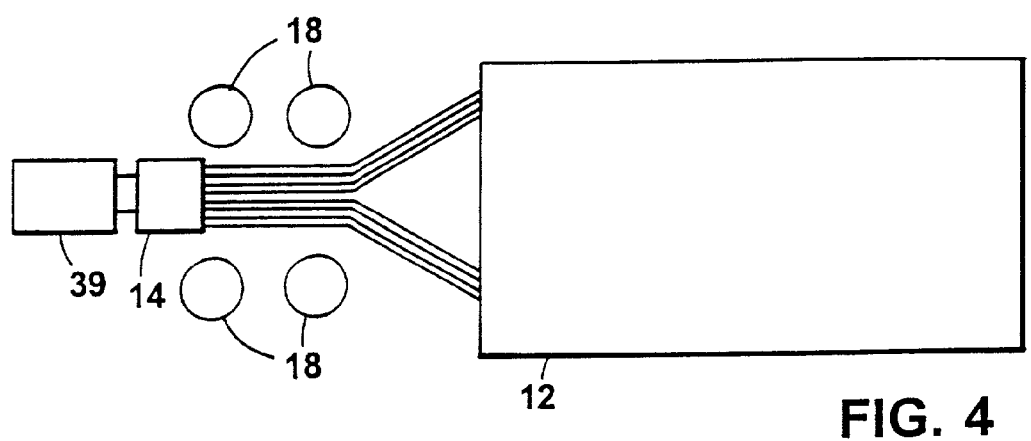
FIG. 4 is a diagram of input keys.

Referring to FIG. 4, the device 10 can receive input via input keys 18. Preferably, the input keys 18 are conductive concave "dome switches" laminated between the top and bottom layers of the device 10. Localized areas directly under the dome switches are internally laminated with a rigid material to increase the reliability of the switches and improve tactile feedback. Pressing a dome switch 18 completes an electric connection which the integrated circuit 39 senses for closure. The connection occurs over circuits screen-printed onto the bottom layer with conductive inks.

Figure 5:
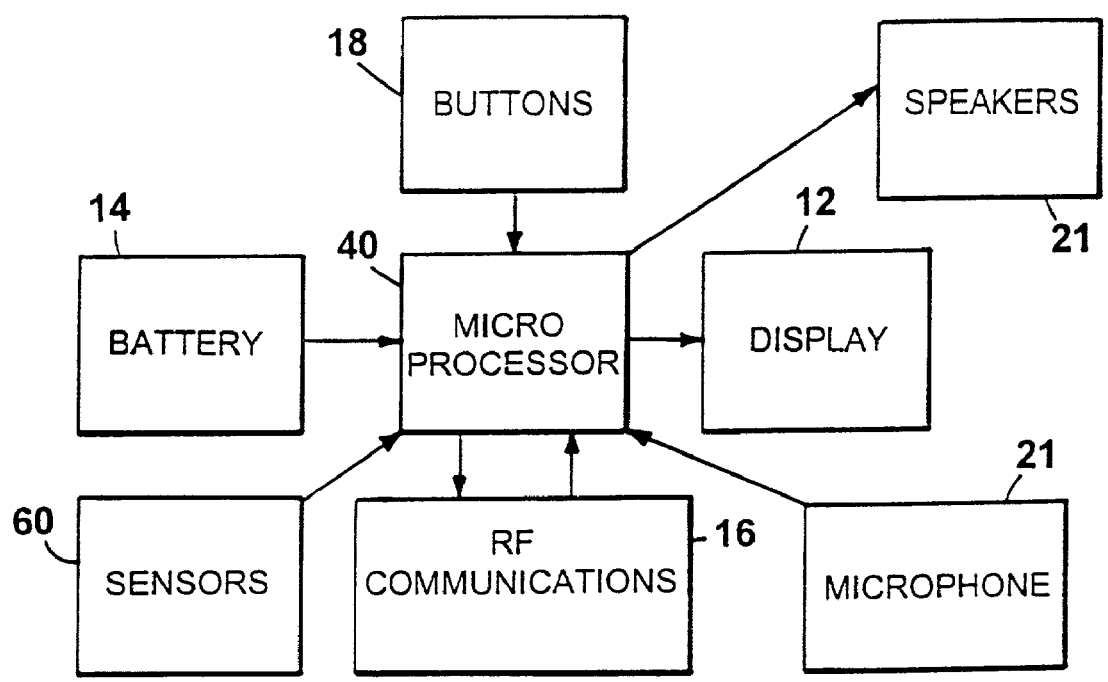
FIG. 5 is a block diagram of device components.

Referring to FIG. 5, the microprocessor 40, powered by a power source 14, controls device 10 functions. In addition to communication element 16, input keys 18, and microphone 21, the microprocessor 40 can receive input from sensors 60 that physiologically monitor a wearer of the device 10. For example, a piezoelectric polymer film such as poly vinylidene fluoride (PVDF) can acoustically collect different physiological data such as a wearer's heart rate. Other sensors can detect electrical energy, thus collecting electrocardiographic (ECG) data. The collected data can be displayed and/or stored for future download providing medical care providers with information about heart rate, abnormal heart rhythms, etc. The device 10 could also incorporate sensors such as an accelerometer to collect and display pedometer data.

The microprocessor 40 not only drives the display 12 but can also support multiple applications. For example, an application can provide compatibility with different smart card communication protocols. This feature enables the device 10 to offer smart card functions. One of the most common functions of smart cards today is as a stored-value card, which contains monetary value in an embedded microchip. Other smart card functions include providing access to ATM machines, GSM (Global System Management) cellular phones, television set top boxes, PC based applications such as internet chip card payment systems, screen phones, pay telephones, stored value systems (sometimes referred to as an "electronic purse"), public transportation systems, health insurance and health care provider systems, government benefit programs, and loyalty systems such as retailer frequent shopper.

Runners, who often prefer not to carry money or other forms of identification while jogging, can use the device as a timer, identification, a physiological monitor, and as a mechanism for paying for goods and services at the growing list of venues that offer smart card service. When the exercise session is completed, a jogger could download the collected data (e.g., heartrate) to a personal computer which could track and display the data over a long period of time.

Health care providers can use the wearable device 10 to affix patient information to a patient without discomfort. The device 10 might store and display medication and medical condition information. Quick access to such information could be critical in deciding what emergency treatment to give a patient.

The microprocessor 40 may also control a wireless communication element 16 to handle cellular messaging or paging services. For example, the device 10 can receive RF Short Message Service message and display the information described by the message on the display 12. Additionally, the microprocessor 40 can coordinate reception and transmission of wireless communication, for example, by acting as a cellular phone.

The microprocessor 40 may also handle applications such as Java applets. Applications may include compression/decompression programs that reduce the amount of information communicated.

Figure 6:
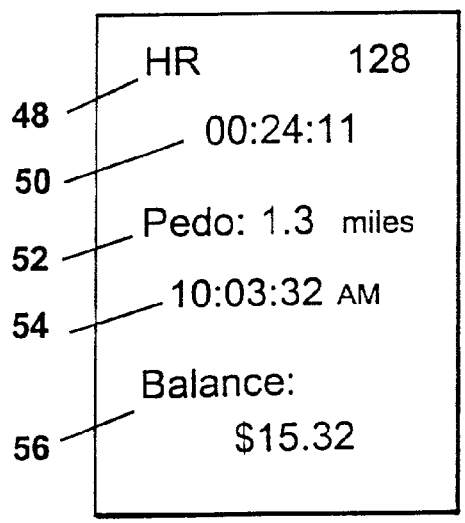
FIG. 6 is a diagram of a sample display.

Referring to FIG. 6, the flexible display element 12 may present a wearer with information that includes the wearer's heart rate 48 as sensed by device sensors, a stopwatch indicator 50, a pedometer 52, the current time 54, a balance of "smart card" money 56 retained in the device, and other information.

Figure 7:
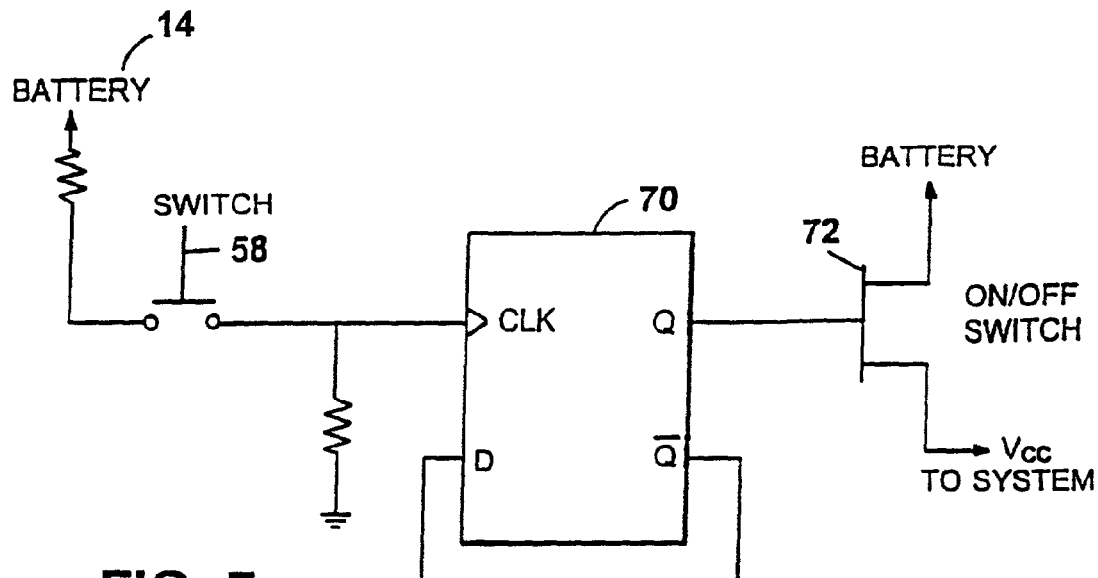
FIG. 7 is a diagram of a kickstart circuit that can control device power.

Referring to FIG. 7, as mentioned, in the preferred embodiment, the device 10 may include a power source 14. While the device 10 consumes little power, the device 10 can provide several methods of conserving energy. A kickstart circuit 70 (e.g., a flip-flop 70 that controls power source 14) connected to a user controlled contact area (e.g., one of the input keys) can control power consumption. Pressing a contact area causes the kickstart circuit 70 to initiate power output from the power source 14. The kickstart circuit can provide power for a pre-determined time period or until a subsequent pressing of the contact area. In another implementation, the contact area could instead merely connect otherwise disconnected wires to draw power from the power source 14. This later implementation requires continual pressure on the contact area to draw power. As mentioned, the display element does not need power to display a static image when the power source does not deliver power. A contact area 58 can control other functions, for example, clearing the display element.

Figure 8:
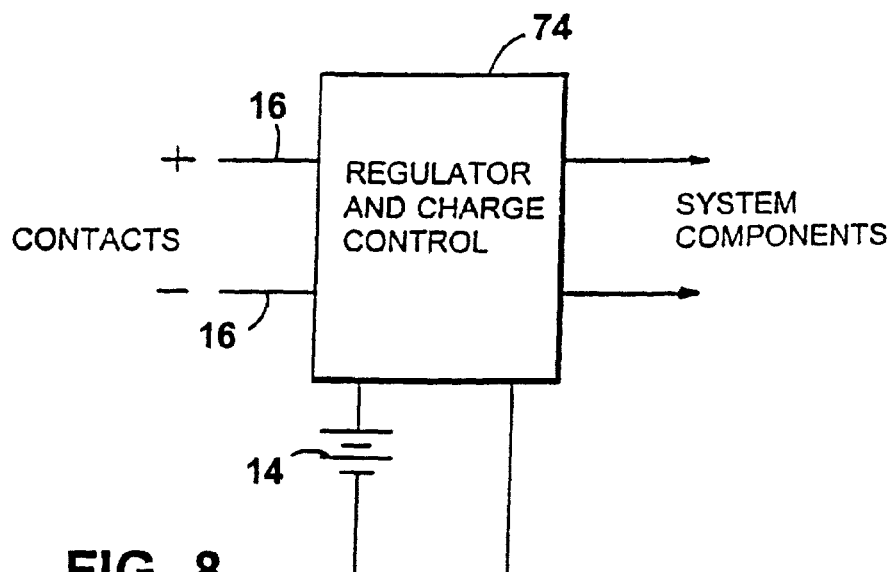
FIG. 8 is a diagram of a regulator and charge control for recharging a power source.

Recharging the power source 14 can be performed in a variety of ways. As shown in FIG. 8, the device 10 could include a regulator charge control circuit 74 that accepts current and voltage from an external power source (e.g., a smart card reader) via contacts for storage in a battery 14. A wireless device can recharge a power supply 14 from communication signals boosted to both transmit information and power.

Figure 9:
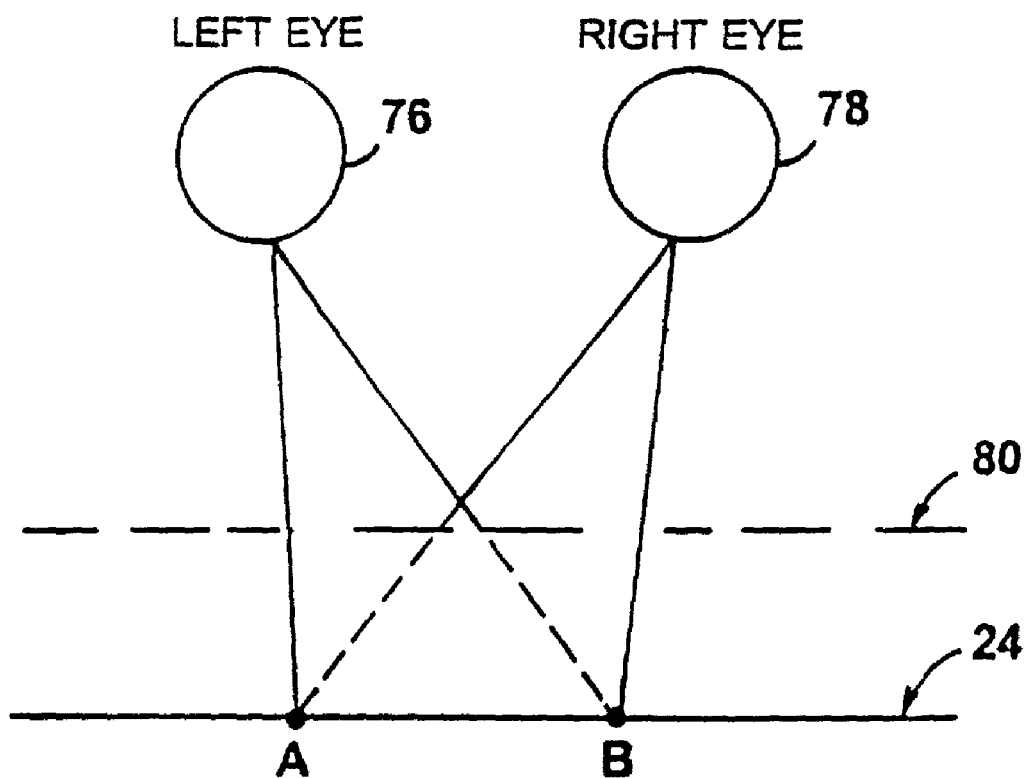
FIG. 9 is a diagram of a barrier strip layered over the flexible display element to provide stereoscopic effects.

Referring to FIG. 9, the display 12 can offer stereoscopic effects such as images that appear three-dimensional and images that alter their appearance based on viewing angle (e.g., a face that winks as a viewer moves the display). For example, an LCD barrier strip 80 (described in U.S. Pat. No. 5,315,377 to Isono, incorporated by reference) intersperses vision blocking barrier regions with viewing regions to control the image perceived by a viewer. By choosing appropriate underlying LCD image, the barrier strip 80 alters image appearance. As shown in FIG. 9, left eye 76 sees point A, but not point B, while right eye 80 sees point B, but not point A.

Figure 10:
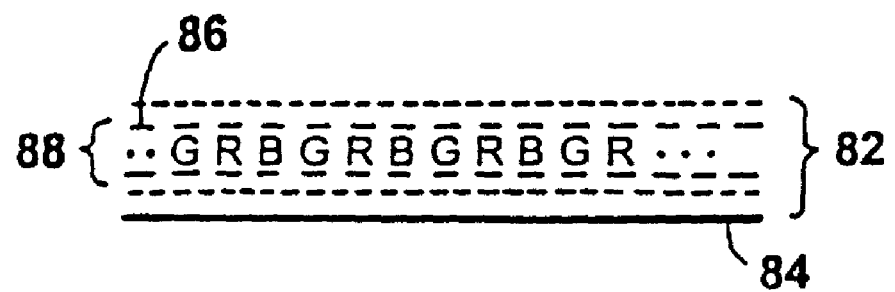
FIG. 10 is a diagram of a multi-color display.

Referring to FIG. 10, a filter layer 88 can add color to an otherwise monochromatic LCD display. The filter layer 88 may include color filters for red, green, and blue. A pixel 86 either blocks color filtered light or permits the color to illuminate a pixel 86. Though each pixel 86 only shows red, green, or blue, the viewer spatially integrates the colors to perceive combinations of the above colors (e.g., purple).

Figure 11:
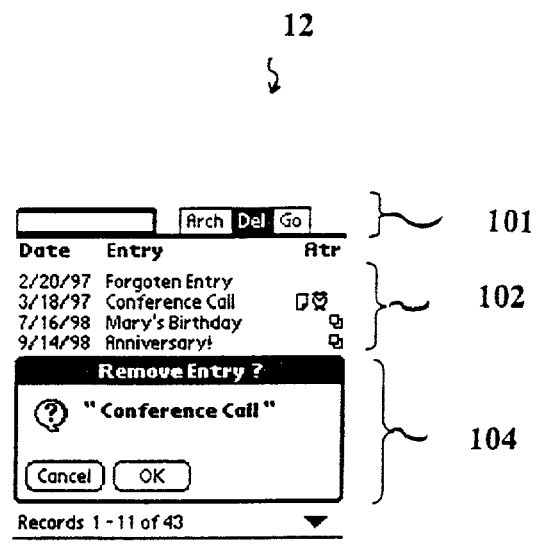
FIG. 11 is a diagram of a sample display produced when the wearable device executes personal digital assistant instructions.
Figure 12:
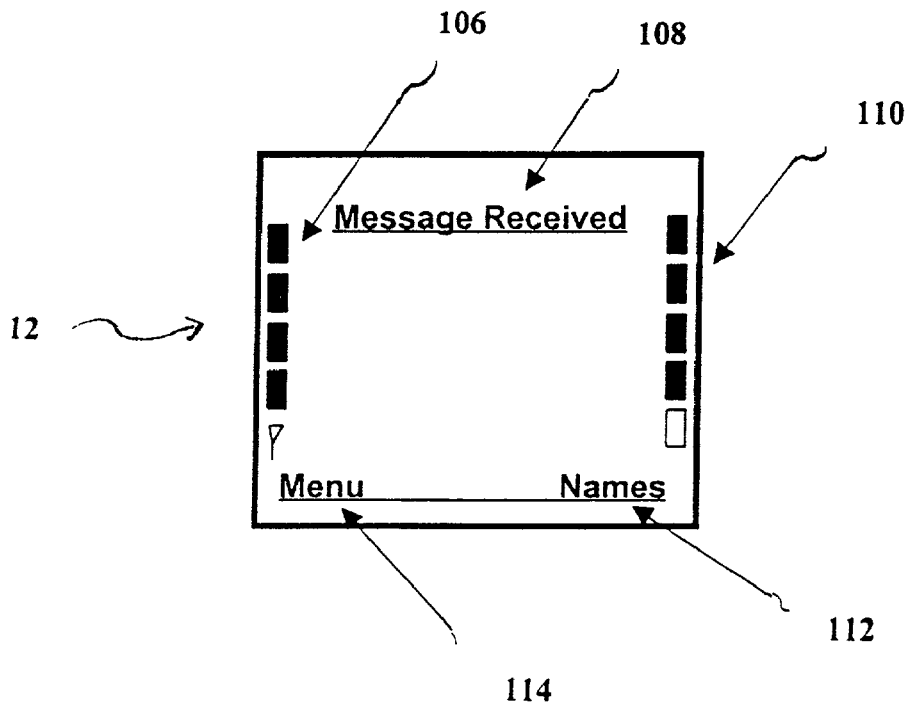
FIG. 12 is a diagram of a sample display produced when the wearable device executes instructions for communicating.

Referring to FIGS. 11 and 12, the wearable device can have the same physical exterior and internal components whether being used as a pager, personal digital assistant, cell phone, game, pedometer, or a combination thereof. The flexible display element 12, however, can present a display based on the function being performed by the device. For example, the device can execute personal digital assistant (PDA) software instructions that perform functions such as displaying and storing calendar and scheduling information, storing entered notes, and maintaining an electronic address book. When executing personal digital assistant software instructions, the flexible display element 12 can present a display that includes a pull down menu 101, list field 102, and dialog menu box 104.

As shown in FIG. 12, when being used for communication (e.g., when acting as a cellular phone or pager), the flexible display element 12 includes information such a signal strength indicator 106, a message field 108, a battery power indicator 110, a phone name list softkey 112, and a menu function softkey 114.

Figure 13:
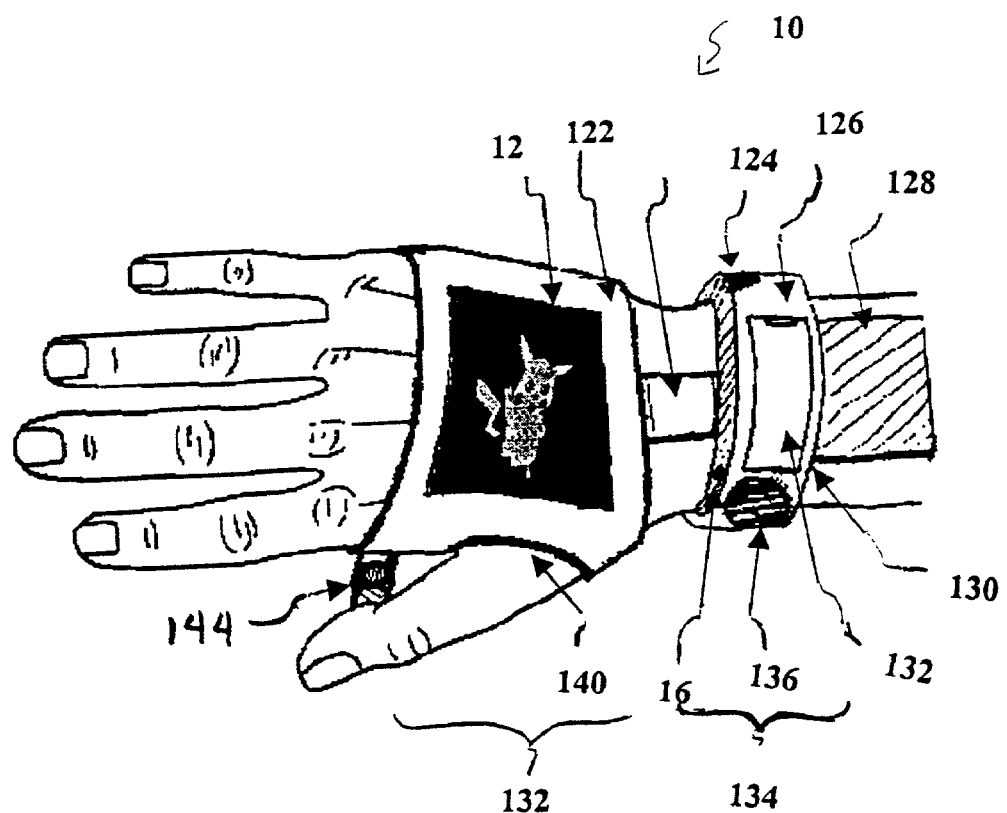
FIG. 13 is a diagram of a wearable device.

Referring to FIG. 13, a wearable device 10 can be used to provide a portable electronic game system. For example, the processor can execute instructions for different video games (e.g., electronic card games, arcade games and electronic pets). The games can be loaded from a smart card 128. The smart card 128 can also be used to store scores and/or character data. The instructions can also be loaded via a wireless communication element 16. Different input controls (e.g., wireless joystick 144) permit users to interact with the video games. For example, in a shooting-type game, keying elements (not shown) can indicate the positive and negative directions on two axes. A fifth keying element can be used as a shooting trigger. The communication element 16 may be an infrared serial link (e.g., link using the IrDA Infrared standard) used to exchange information with another game device allowing two or more users to play each other. The device 10 can also communicate with video arcade machines and/or PCs. For example, gaming character definitions stored on the wearable device can be downloaded to a different video game machine and the user could play the arcade version with additional powers and self-defined characters. The appearance of the device can be tailored for different games. For example, the device exterior can be colored, have holographic layers, or sculptural elements corresponding to a particular game.

The device 10 can also act as a remote control. For example, the display can show volume and channel information. By interacting with the device, the wireless control can transmit remote control signals to a TV, VCR, or other component. The device 10 can also be used to receive and display television signals or a series of static images such as book or magazine pages.

In some embodiments, the device 10 is constructed so that the flexible display 12 wraps around a user's hand. This embodiment permits use of a larger display 12 which may be preferred for use of the device as a TV, personal digital assistant (PDA), video game, or device for listening to and viewing music videos. As shown, the device 10 includes a display subassembly 142 and a battery/processor subassembly 134. The device 10 can receive user input from one or more input controls 144.

The display subassembly 142 includes a flexible display 12 overmolded into a flexible plastic 22. The display subassembly 142 is constructed to wrap around a user's hand. For example, as shown, a user can insert their thumb into the thumbhole 140 and strap the display assembly 12 around their hand using snaps or Velcro (not shown). A flexible cable 122 connects the display subassembly 142 to display driver electronics included in the battery/processor subassembly 134.

The battery/processor subassembly 134 includes a battery compartment 132, a smart card connector 130 for interfacing with a smartcard 128, processor electronics (e.g., a printed circuit board (PCB)), a wriststrap 126, a speaker 136, and communication element (e.g., an infrared transceiver, a wireless inductive loop, or antenna) 16. The device 10 can communicate with external devices such as computers and smart card readers.

Figure 14:
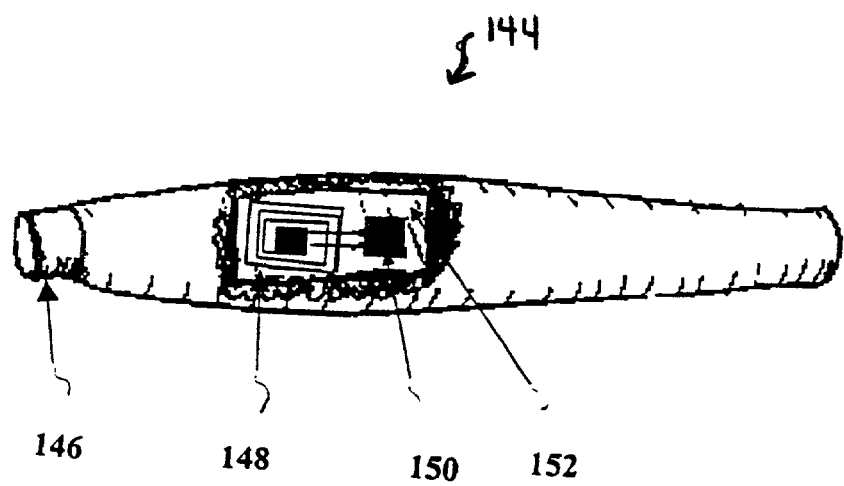
FIG. 14 is a diagram of a wireless joystick.

Referring to FIG. 14, the device can receive input from an input control 144 such as a directional input control. For example, the input control 144 can be a wireless free-floating joystick. The joystick 144 includes a solid-state accelerometer 148, 150 (e.g., an Analog Devices™ ADXL202) which is capable of distinguishing and measuring accelerations along one or two orthogonal axes in a plane or planes of motion. Thus, a user can provide directional input (e.g., up, down, left, and right) by simply moving their hand.

Figure 15:
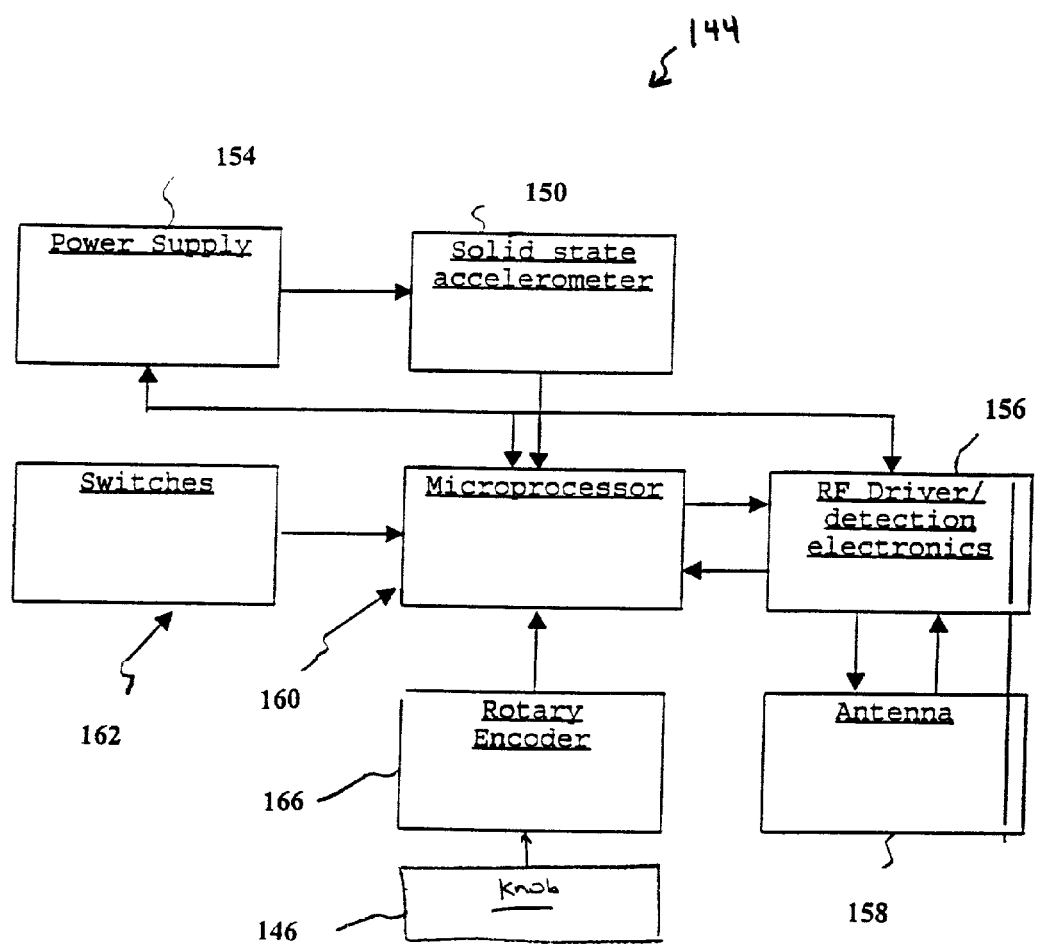
FIG. 15 is a block diagram of the wireless joystick.

Referring to FIG. 15, the free-floating joystick 144 includes a knob 146 connected to a combined rotary encoder/switch 166. Rotating the knob 146 causes the rotary encoder 166 to provide rotational position information which can be processed by software or hardware instructions to scroll through screens, etc. The encoder 166 feeds two signals to a joystick microprocessor 160. Each signal is composed of a pulse train whose phase is shifted 90 degrees from the other signal (quadrature signals). The switching rate of the two signals is directly related to the angular rotational rate of the knob 146 and the rotational direction determines the relative phase of the two signals. Thus, the direction and degree of rotational movement of the knob 146 is completely defined by the quadrature signals. Pressing the knob 146, similar to clicking a ballpoint pen, activates a switch providing another input signal for different applications (e.g., selecting user interface elements or shooting a weapon in a game). Embedded in the joystick 144 is a radio-frequency inductive loop antenna 158 for providing both power to the joy-stick and communicating with the battery/processor assembly 134 or other host-system. The battery/processor assembly 134 can include a corresponding inductive loop embedded in the display subassembly in a location that results in the two inductive loops being placed adjacent to each other when the joystick is held in the user's hand. The joystick 144 may, alternatively, contain its own battery as part of the power supply 154 which allows for communication between the joystick 144 and the battery/processor assembly 134 at distances of at least three feet. This allows the user to operate the joystick 144 with a hand not wearing the wearable device. The joystick may also include user input switches (e.g. buttons) along its surface.

The joystick 144 includes a microprocessor 160 for detecting closure of additional switches 162 (e.g., buttons along the length of the joystick 144 exterior), determining rotary encoder 166 position, and processing information from the accelerometer 150, and the antenna 158 via RF electronics 156. The microprocessor 160 integrates this information into a data format for serial transmission via the antenna 158. The components of the joystick are preferably mounted on an internal PCB.

Referring again to FIG. 13, the device 10 can receive input from a variety of sources in addition to or in lieu of the joystick. In other embodiments, the device 10 can receive user input via flat piezoelectric force-sensors which detect the direction of force. The piezoelectric directional control element can be put on a wearable element much like a thumb-cap that can be inserted over the wearer's finger.

In another embodiment, the input control can be a small detachable keypad with four directional keying elements indicating positive and negative directions along two typically orthogonal axes along with fifth and sixth keying elements.

In another embodiment the input control can be a "touch-sensitive pad" that provides directional control by determining the contact location on a flat area via measurement of either the electrical capacitance or resistance of lines organized in a typically X-Y grid.

Figure 16:
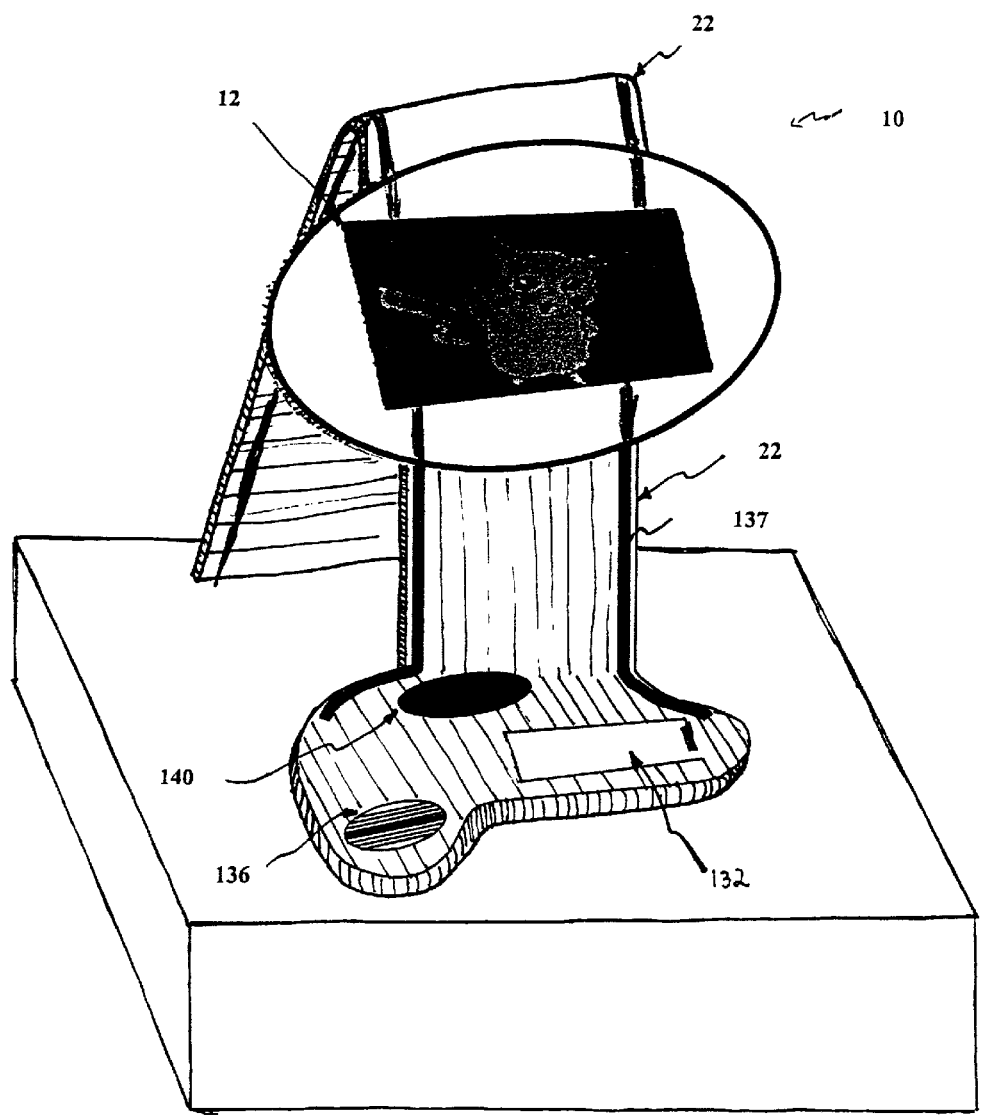
FIGS. 16-17 are diagrams illustrating mounting of the wearable device.
Figure 17:
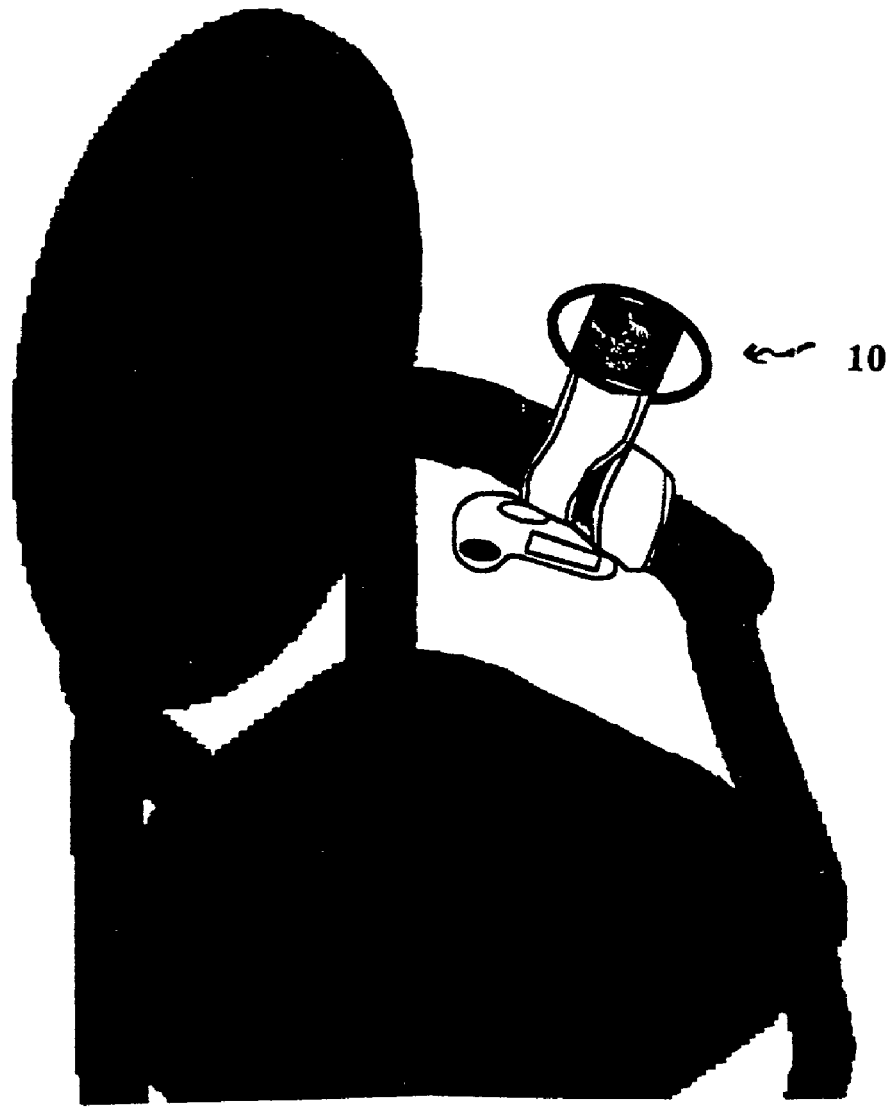

Referring to FIGS. 16-17, the device 10 can include ductile materials or other mechanisms which hold the display 12 at a good viewing angle when removed from the wearer's body, placed on a tabletop or other surface, and molded into a particular shape. In one embodiment, the wearable device body 22 (e.g., strap) includes a wire 137 embedded in a thermoplastic. FIG. 16 shows the wire as being visible, however, in the preferred embodiment the wire is hidden by the device 10 exterior. The wire is preferably a ductile, heavy-gauge wire that retains a given shape imparted by a user. After removing the wearable device 10 from the wearer's body, the wearer can mold the device 10 into a stable shape that presents the display 12 at a comfortable viewing position. FIG. 16 shows the device 10 bent to present the display 12 at a comfortable viewing angle. FIG. 17 shows the device 10 wrapped around a chair arm to hold the display 12 steady when a flat surface is not available.

In other embodiments mechanisms or materials provide the ability to control the position of the display when the wearable device 10 is placed on a surface or object. For example, the device 10 body 22 may include a series of short, reticulated rigid elements connected to each other via a spring-loaded cup-and-ball arrangement much like the neck of a "snake-light".

Figure 18:
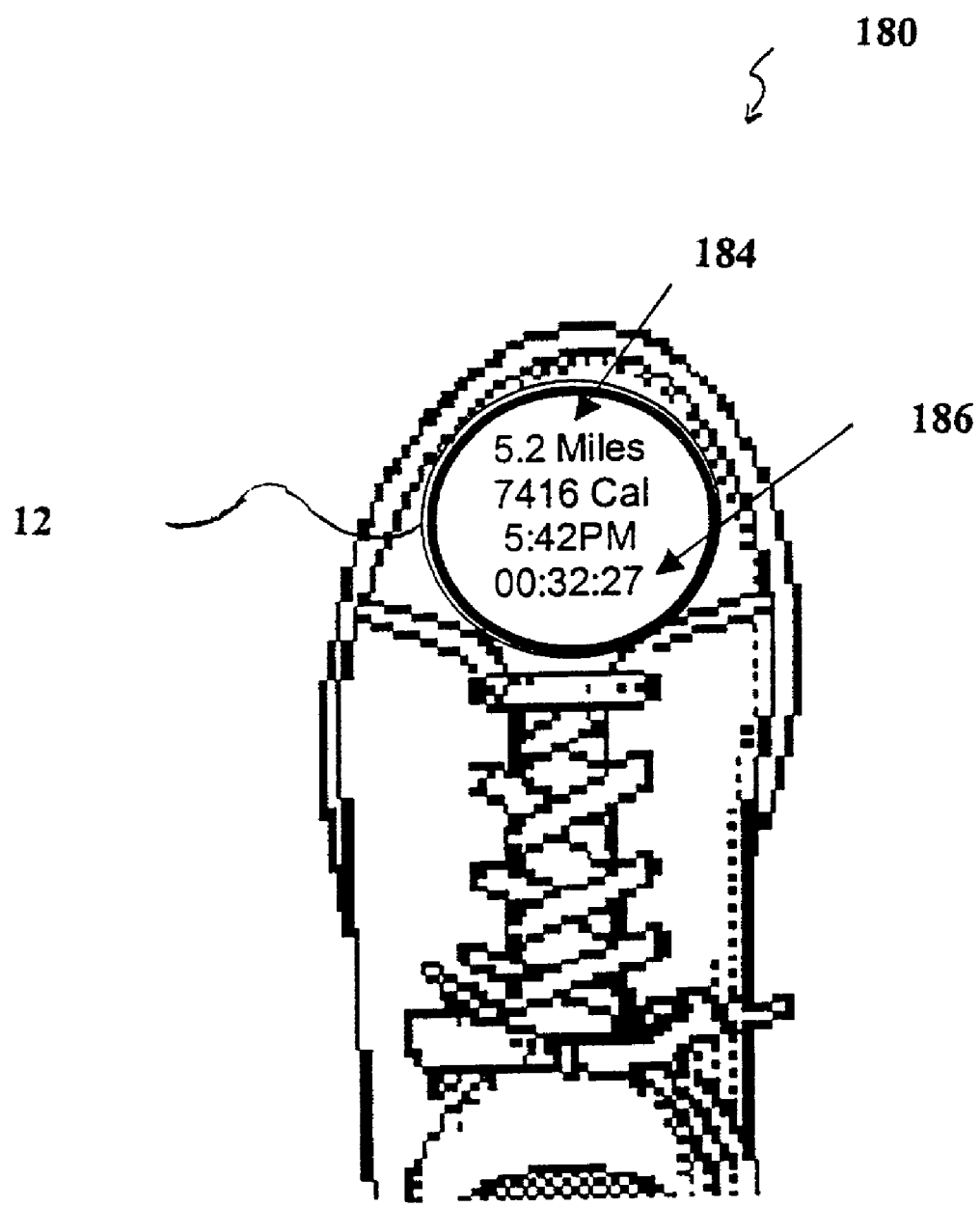
FIG. 18 is a diagram of a shoe including a flexible display.

Referring to FIG. 18, the flexible display 12 and circuitry can be included in articles of clothing. An article of clothing is typically constructed from one more different materials. For example, a sneaker 180 can include canvas, rubber, and/or plastic pieces connected and configured to accept a wearer's foot. As shown, the sneaker 180 also features the flexible display 12 and associated circuitry. The flexible display 12 can present physiological and pedometric (e.g., mileage 184 and duration 186) information to a walker or jogger. The display can present advertisements, promotions, and company and/or product logos. The display can be included in a variety of locations on the shoe 180 such as the toe, heal, or side.

Figure 19:
FIG. 19 is a diagram of a hat including a flexible display.

Referring to FIG. 19, the flexible display 12 and display control circuitry can also be included in a hat 188 (as shown) or other articles of clothing such as a belt, a shirt, or a pair of pants. Preferably, the flexible display 12 and circuitry can be permanently affixed to the article of clothing via sewing or a thermoplastic adhesive. The flexible display 12 can also be affixed temporarily via velcro or snaps.

Other embodiments are within the scope of the following claims.

What is claimed is:

1. A wearable article of clothing, comprising: a flexible strap configured and sized to secure onto a wearer, the flexible strap comprising a non-woven holographic layer covering at least a portion of the strap's visible exterior surface.

2. The article of claim 1 wherein the holographic layer presents a holographic image of one of the following: leather and metal.

3. The article of claim 1 wherein the holographic layer is removable.

4. The article of claim 1 further comprising:
a display element connected to the strap; and
circuitry connected to the display element for controlling the display presented by the display element.

5. The article of claim 4 wherein the display element comprises a flexible display element.

* * * * *